United States Patent [19]

Kimura

[11] 4,291,344
[45] Sep. 22, 1981

[54] TIME BASE CORRECTING SYSTEM

[75] Inventor: Kenji Kimura, Tachikawa, Japan

[73] Assignee: Olympus Optical Company Limited, Tokyo, Japan

[21] Appl. No.: 94,457

[22] Filed: Nov. 15, 1979

[30] Foreign Application Priority Data

Nov. 18, 1978 [JP] Japan .................. 53-143078

[51] Int. Cl.³ .................. H04N 5/785; G11B 27/10; G11B 5/02
[52] U.S. Cl. .................. 360/36
[58] Field of Search .................. 360/36, 33; 358/8

[56] References Cited

U.S. PATENT DOCUMENTS

| | | | |
|---|---|---|---|
| 3,580,991 | 5/1971 | Krause | 358/8 |
| 3,637,936 | 1/1972 | Krause | 358/8 |
| 3,921,209 | 11/1975 | Yoshino | 360/23 |
| 3,975,764 | 8/1976 | Kobayashi | 360/23 |
| 4,118,738 | 10/1978 | Arnstein | 358/8 |

OTHER PUBLICATIONS

*Pulse, Digital, & Switching Waveforms*, by Millman & Taub, ©1965, pp. 49, 50.

Primary Examiner—Alan Faber
Attorney, Agent, or Firm—Toren, McGeady and Stanger

[57] ABSTRACT

A system for correcting the time base in a fixed type magnetic recording and reproducing apparatus is disclosed. The system involves picking up video signals with a fixed head, reproducing the video signals with a demodulator, correcting time base variations of the reproduced video signals with a variable delay member, comparing the output signals of the variable delay member with reference signals in order to detect the time base variations caused in the reproduced video signals by the tape running irregularly and the time base variations caused by a change with time or the like in output signals of the variable delay member, feeding back the obtained time base variation signals to the variable delay member through a low-phase filter and a mixer thereby to control the delay member, comparing the phase of input signals to the variable delay member with the phase of the reference signals in order to correct high frequency components of the time base variations which are removed by the low-pass filter, and supplying the obtained time base variation signals to the variable delay member through a high-pass filter thereby to control the delay member.

3 Claims, 2 Drawing Figures

TIME BASE CORRECTING SYSTEM

BACKGROUND OF THE INVENTION

The invention relates to a system for correcting a time base in a fixed head type magnetic recording and reproducing apparatus.

One type of fixed head type VTR for recording and reproducing each information with the use of a plurality of heads operates by dividing video signal information into a plurality of channels using a system for treating images such as a Hadamard transformation, time division or the like.

In such a VTR, the time base of a signal reproduced by heads of each channel may be varied by extension of the magnetic tape, tape running irregular, a change of the head position with time or the like, so that a good reproduced image cannot be obtained.

In a magnetic recording and reproducing apparatus such system, therefore, time base variation at the time of reproduction, are corrected by multi recording horizontal synchronizing signals in each channel at the time of recording. However, positive correction of the time base variation cannot be reliably accomplished so that a good reproduced image cannot be obtained.

SUMMARY OF THE INVENTION

An object of the present invention is to eliminate the above described disadvantages of such a conventional system.

Another object of the present invention is to provide a system for correcting a time base in a fixed head type magnetic recording and reproducing apparatus capable of correcting the time base variation between channels and also correcting the time base variation caused by a change with time or the like so as to obtain a remarkably excellent image.

According to the present invention a system for correcting time base for use in a fixed head type magnetic recording and reproducing apparatus, involves picking up video signals with a fixed head, reproducing the picked video signals with a demodulator, correcting time base variations of the reproduced video signals with a variable delay member, comparing the output signals of the variable delay member with reference signals in order to detect the time base variations caused in the reproduced video signals by tape running irregular and the time base variations caused by a change with time or the like in output signals of the variable delay member, feeding back the obtained time base variation signals to the variable delay member through a low-pass filter and a mixer thereby to control the delay member, comparing the phase of input signals to the variable delay member with the phase of the reference signals in order to correct high frequency components of the time base variations which are removed by the low-pass filter and supplying the obtained time base variation signals to the variable delay member through a high-pass filter thereby to control the delay member. According to other features of the invention, reference signals are derived from a reference signal generator which is connected to the demodulator. The reference signal generator is a fly-wheel oscillator.

BRIEF DESCRIPTION OF THE DRAWING

Other objects and aspects of the invention will become apparent from the following description of embodiments with reference to the accompanying drawings in which.

DESCRIPTION OF THE PREFERRED EMBODIMENT

Figure 1:
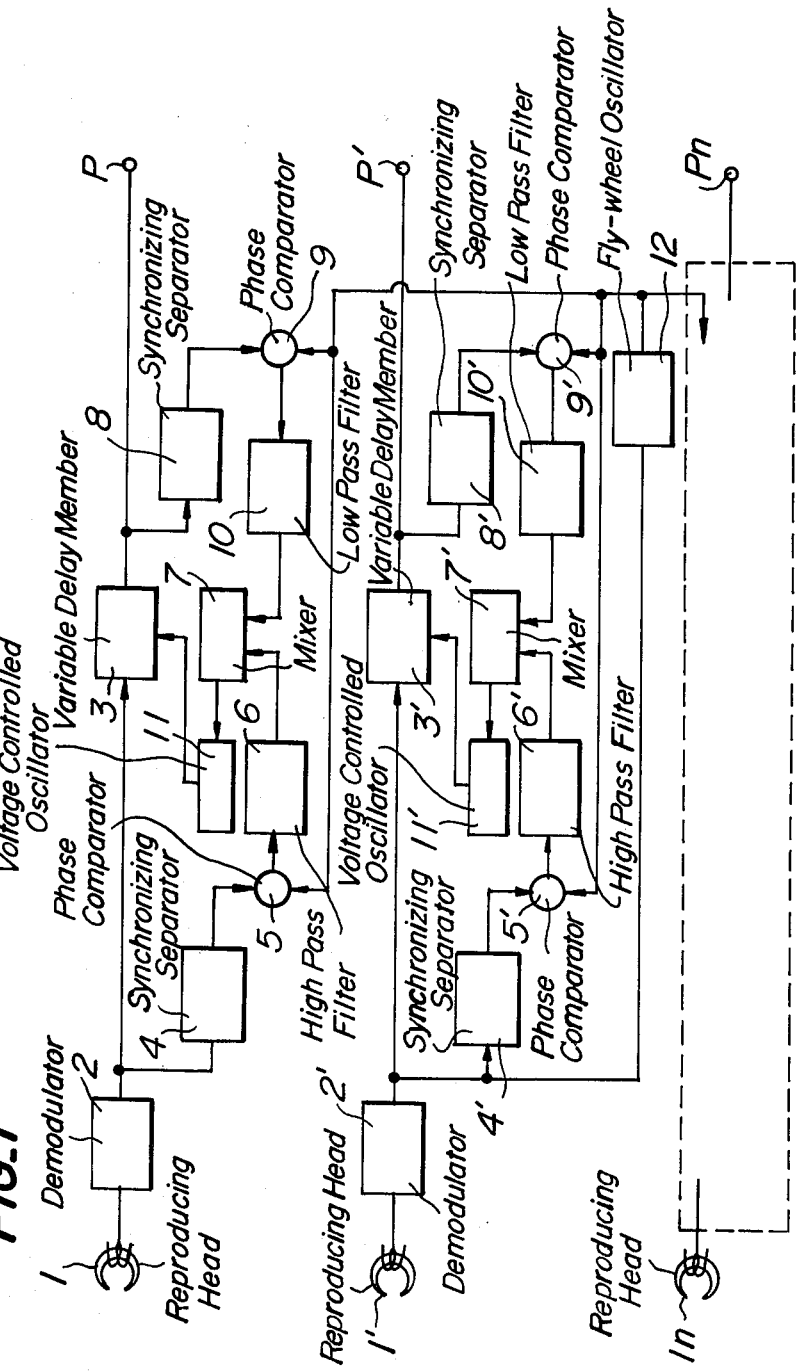
FIG. 1 is a block diagram showing one embodiment of a system for correcting a time base according to the present invention.
Figure 2:
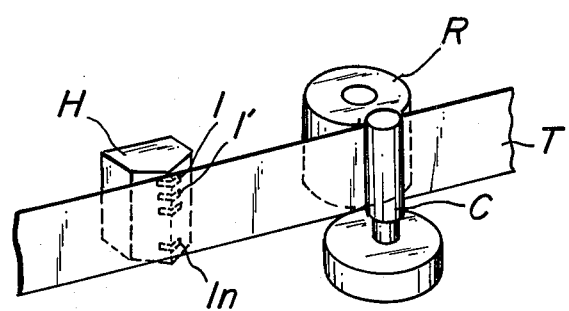
FIG. 2 is a perspective view showing a part of a fixed type magnetic recording and reproducing apparatus for use in the sytem according to the present invention.

FIGS. 1 and 2 show one embodiment of a system for correcting a time base according to the present invention.

In a multi-channel head H shown in FIG. 2, a reproducing head 1 of a first channel is connected to a demodulator 2 (in FIG. 1) whose output is supplied to a variable delay member 3 consisting of a CCD (charged coupled device). Video signals obtained through the above variable delay member 3 are supplied to an output terminal P. Signals from the demodulator 2 are also supplied to a first phase comparator 5 through a first synchronizing separator 4.

Signals from the phase comparator 5 are supplied to a mixer 7 through a high-pass filter 6. The mixer 7 is connected so that signals from the variable delay member 3 are supplied to a second phase comparator 9 through a second synchronizing separator 8, and the output signals of the comparator 9 are supplied to the mixer 7 through a low-pass filter 10.

The output signals of the mixer 7 are supplied to a voltage controlled oscillator 11, and the output signals of the voltage controlled oscillator 11, are applied to the variable delay member 3. Reference signals applied to the first and the second phase comparators 5, 9 in the circuit connected as described above are derived from a fly-wheel oscillator 12. The latter receives reference signals in the form of horizontal synchronizing signals obtained, for example, from a demodulator 2' of the second channel.

In addition, the second channel is also connected from a reproducing head 1' to a voltage controlled oscillator 11' in the same manner as the first channel and so on (for instance, 14 channels). In FIG. 2, reference character C is a capstan shaft, reference T is a magnetic tape and reference character R is a pinch roller.

The operation of the apparatus for correcting the time base variation constructed as described above follows. In the first place, FM signals reproduced by the reproducing head 1 of the first channel are demodulated by the demodulator 2 and delivered as a reproduced video signal.

The reproduced video signals are applied to the input of variable delay member 3 and output signals delayed by a predetermined value therein are delivered therefrom as a video output signal.

The variable delay member 3 uses a CCD. The transferring clock signals supplied to the CCD are driven by output signals of the voltage controlled oscillator 11. Hence, the phase of output signals of the variable delay member 3 is changed by the oscillation frequency of the oscillator 11.

The output signals of the variable delay member 3 are supplied to the second synchronizing separator 8 and the horizontal synchronizing signals contained in the video signals are separated therein. The horizontal synchronizing signals are now supplied to one input terminal of the second phase comparator 9.

The other input terminal of the phase comparator 9 receives reference signals from the fly-wheel oscillator 12, so that the output of the phase comparator 9 produces time base variation signals having a phase error of respective input signals.

The phase error signals are supplied to the mixer 7 through the low-pass filter 10, mixed therein with signals supplied through the high-pass filter 6, at a proper value, and supplied to the voltage controlled oscillator 11 to control its oscillation frequency.

That is, the reproduced video signals obtained by the demodulator 2 are supplied to the first synchronizing separator 4 and the horizontal synchronizing signals are separated therein. The horizontal synchronizing signals are supplied to the first phase comparator 5 and compared therein with reference signals from the fly-wheel oscillator 12.

The signals compared by the comparator 5 produce time base variation signals having phase errors of respective signals, these signals are supplied to the high pass filter 6 thereby to remove the low frequency component and applied to the mixer 7. The high pass filter 6 passes only the frequency components of more than several Hz.

The outputs obtained by the thus supplied signals control the oscillation frequency of the voltage controlled oscillator 11 so as to control the delay time of the variable delay member 3.

In the system processing signals supplied to the mixer 7 as described above, the signal processing system for supplying the low frequency components forms a negative feedback loop for causing coincidence of the phase of the horizontal synchronizing signal of the video output signal with that of the reference signal.

Accordingly, if the center frequency of the voltage controlled oscillator 11 is varied with time or the like, the delay time of the variable delay member 3 is varied. However, the amount of variation of the delay time becomes 1/G when a gain of the negative feedback loop gain is made G due to the negative feedback loop. Therefore, the larger the negative feedback loop gain G, the more precise the phase can be agreed. But making the gain of the whole negative feedback loop system large causes problems such as oscillation by a phase lag of signals of the whole loop system, occurrence of ringing at the time of a transient phenomenon and the like. Therefore, in order to avoid oscillation inherent to the loop system, the low-pass filter 10 is inserted into the loop system thereby to remove the high frequency components.

The low-pass filter 10 only passes the low frequency components of less than several Hz thereby to make the gain G large.

As described above, the phase of the time base can be made precisely to coincide with that of the reference signal, but the time base variation (jitter component) of the high frequency components removed by the low-pass filter 10 cannot be corrected. This correction of the high frequency components is treated in the signal system of the high-pass filter 6. That is, in the signal system for correcting the high frequency components only, the phase difference between the input signals of the variable delay member 3 and the reference signals is detected, and the time base variation of the variable delay member 3 is corrected to be a minimum, so that there is no closed circuit. The reference signals are obtained from the fly-wheel oscillator 12, but the input reference signals of the oscillator 12 may be a horizontal synchronizing signal reproduced in any channel, and in this embodiment, the horizontal synchronizing signal of the second channel is used.

The reference signals obtained by the fly-wheel oscillator 12 are also supplied to phase comparators 5', 9' of the second channel signal system, so that the time base of the video output signal of each channel can precisely be made to coincide with the reference signal, and the jitter and the drift are also corrected to the same amount as the jitter and drift remaining in at least the fly-wheel oscillator 12.

In the same manner, each channel from the third channel to the N channel performs the same action, and the time base of respective video signal outputs can be made to coincide with that of the reference signals.

As described above, according to the present invention, in order to detect the time base variation caused by tape running irregularity of the reproduced video signals contained in the output signals of the variable delay member and the time base variation caused by the change with time or the like, the output signals of the variable delay member are compared with the reference signals, the thus obtained time base variation signal is fed back to the variable delay member through the low-pass filter thereby to control the delay member for the purpose of making the feedback gain larger. In order to correct the high frequency components of the time base variation removed by the low-pass filter, the phase of the input signals of the variable delay member is compared with that of the reference signals, and the thus obtained time base variation signal is supplied to the variable delay member through the high-pass filter. This is done to control the delay member so as to precisely correct the time base variations caused by tape running irregularity, extension of a tape, a change of the head fixing position with time or the like. As a result, the present invention can provide a system for correcting a time base in a fixed head type magnetic recording and reproducing apparatus.

What is claimed is:

1. In a system for correcting time base for use in a fixed head type magnetic recording and reproducing apparatus, comprising a fixed head for picking up video signals, a demodulator for reproducing the picked video signals, a variable delay member for correcting time base variations of the reproduced video signals, characterized in means for comparing the output signals of the variable delay member with reference signals in order to detect time base variations caused by tape running irregularity in the reproduced video signals and the time base variations caused by changes with time contained in output signals of the variable delay member, a low-pass filter and a mixer for feeding back the time base variation signals to the variable delay member to control the delay member, means for comparing the phase of input signals of the variable delay member with the phase of the reference signals to correct high frequency components of the time base variations which are removed by the low-pass filter, and a high pass filter for supplying the time base variation signals to the variable delay member to control the delay member.

2. A system as in claim 1, wherein a reference signal generator connected to the demodulator produces the reference signals.

3. A system as in claim 2, wherein the reference signal generator is a fly-wheel oscillator.

* * * * *